US012681322B2

(12) United States Patent
Xu et al.

(10) Patent No.: US 12,681,322 B2
(45) Date of Patent: Jul. 14, 2026

(54) LENS DRIVE MODULE

(71) Applicant: Changzhou AAC Raytech Optronics Co., Ltd., Changzhou City (CN)

(72) Inventors: Tongming Xu, Changzhou (CN); Suohe Wei, Changzhou (CN); Limei Zhao, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 282 days.

(21) Appl. No.: 18/536,282

(22) Filed: Dec. 12, 2023

(65) Prior Publication Data

US 2024/0337858 A1      Oct. 10, 2024

Related U.S. Application Data

(63) Continuation of application No. PCT/CN2023/086307, filed on Apr. 4, 2023.

(51) Int. Cl.
| | |
|---|---|
| *G02B 27/64* | (2006.01) |
| *G03B 5/00* | (2021.01) |
| *G03B 13/36* | (2021.01) |
| *H01F 7/20* | (2006.01) |

(52) U.S. Cl.
CPC ............. *G02B 27/646* (2013.01); *G03B 5/00* (2013.01); *G03B 13/36* (2013.01); *H01F 7/20* (2013.01); *G03B 2205/0007* (2013.01); *G03B 2205/0069* (2013.01)

(58) Field of Classification Search
CPC ........ G02B 27/646; G03B 5/00; G03B 13/36; G03B 2205/0007; G03B 2205/0069; H01F 7/20

USPC ......................................................... 359/557
See application file for complete search history.

(56) References Cited

U.S. PATENT DOCUMENTS

| | | | | |
|---|---|---|---|---|
| 8,681,227 B2 * | 3/2014 | Ryu | .......................... | G03B 5/02 |
| | | | | 348/46 |
| 2013/0119785 A1 * | 5/2013 | Han | ...................... | G02B 27/646 |
| | | | | 310/12.16 |
| 2017/0315376 A1 * | 11/2017 | Hu | ......................... | G02B 27/646 |
| 2019/0137781 A1 * | 5/2019 | Hu | ........................... | G02B 7/09 |
| 2019/0181726 A1 * | 6/2019 | Kuo | ....................... | H02K 11/02 |

FOREIGN PATENT DOCUMENTS

| | | | | |
|---|---|---|---|---|
| CN | 218767525 U | * | 3/2023 | ............. H04N 23/68 |

OTHER PUBLICATIONS

CN-218767525-U—Mar. 2023—Xu—English translation.*

* cited by examiner

*Primary Examiner* — Sharrief I Broome
(74) *Attorney, Agent, or Firm* — Wiersch Law Group

(57) ABSTRACT

The present disclosure provides a lens drive module including a base, a support base disposed on the base, a magnet group connected to the support base, optical image stabilization (OIS) coils disposed on a region of the base corresponding to the magnet group and electrically connected to output points of the base, a lens barrel disposed in an inner ring of the support base, upper leaf springs disposed on a top of the support base, lower leaf springs disposed on a bottom of the support base, and suspension wires each connected at both ends to a respective upper leaf spring and to the base, respectively. The lens drive module of the present disclosure reduces the production cost and enhances the price competitiveness of the lens drive module.

9 Claims, 7 Drawing Sheets

2

LENS DRIVE MODULE

CROSS-REFERENCE TO RELATED APPLICATION

The present application is a continuation of PCT Patent Application No. PCT/CN2023/086307, filed Apr. 4, 2023, which is incorporated by reference herein in its entirety.

TECHNICAL FIELD

The present disclosure relates to the field of optical devices, and in particular relates to a lens drive module.

BACKGROUND

In recent years, electronic devices are generally equipped with a high-performance lens drive module. The high-performance lens module has an auto focusing (AF) function and an optical image stabilization (OIS) function. A main role of the OIS function is to adjust field of view of a camera in order to facilitate compensation of a user's hand shake.

The existing technology generally uses a flexible printed circuit coil (FPC COIL), and the setting of FPC COIL increases production cost and reduces price competitiveness of the lens driver module.

Therefore, it is necessary to provide a lens drive module with reduced production cost and a significantly competitive price.

SUMMARY

The present disclosure aims to provide a lens drive module with reduced production cost and a significantly competitive price.

The present disclosure provides a lens drive module including a base, a support base disposed on the base, a magnet group connected to the support base, optical image stabilization (OIS) coils disposed on a region of the base corresponding to the magnet group and electrically connected to output points of the base, a lens barrel disposed in an inner ring of the support base, upper leaf springs disposed on a top of the support base, lower leaf springs disposed on a bottom of the support base, and suspension wires each connected at both ends to a respective upper leaf spring and to the base, respectively.

As an improvement, the magnet group includes first magnets respectively disposed on two opposite sides of the support base, and second magnets respectively disposed on two other opposite sides of the support base; each of the first magnets includes double magnets stacked along a direction of an optical axis of the lens barrel, and each of the second magnets is a single magnet; and each of the OIS coils is a hollow coil.

As an improvement, each of the OIS coils includes a first OIS coil provided in correspondence with a respective first magnet and a second OIS coil provided in correspondence with a respective second magnet.

As an improvement, the lens barrel is provided with auto focusing (AF) coils each disposed on a region of an outer wall of the lens barrel corresponding to a respective first magnet, the AF coils are connected to each other, and each of the AF coils has a winding plane parallel to a plane formed by an x axis and a z axis.

As an improvement, the double magnets are magnetized in a direction perpendicular to the direction of the optical axis and opposite to each other.

As an improvement, the base is provided with anti-collision structures each disposed on a region corresponding to a periphery of a respective OIS coil.

As an improvement, the lens drive module further includes a housing connected to the base, and the housing encloses with the base to form an accommodation space for accommodating the support base, the magnet group, the lens barrel, the upper leaf springs, the lower leaf springs, and the OIS coils.

As an improvement, the upper leaf springs are attached to top corner regions of the support base, and the lower leaf springs are attached to bottom corner regions of the support base; and the lens drive module further includes: first positioning poles connected to the upper leaf springs and provided on a top of the lens barrel and the top corner regions of the support base, where the upper leaf springs are provided with first positioning holes mating with the first positioning poles; second positioning poles connected to the lower leaf springs and provided on a bottom of the lens barrel and the bottom corner regions of the support base, where the lower leaf springs are provided with second positioning holes mating with the second positioning poles; suspension wire leaf springs each provided between the respective upper leaf spring and a top of a respective suspension wire, where each of the suspension wire leaf springs is at least partially overlapped with the respective upper leaf spring; and solder tabs provided on the support base, where the solder tabs include first solder tabs connected to the upper leaf springs and second solder tabs connected to the suspension wire leaf springs; where the first positioning poles are hot riveted on the support base, and each of the upper leaf springs is welded to a respective first solder tab by laser, and each of the suspension wire leaf springs is welded to a respective second solder tab by laser.

As an improvement, the support base is provided with mounting grooves for setting the first magnets and the second magnets, respectively, and a support frame is embedded in a groove wall of a respective mounting groove for connecting with a respective first magnet or a respective second magnet.

As an improvement, the lens barrel and top corner regions of the support base are provided with first visco-elastic components, and bottom corner regions of the support base and top corner regions of the base are provided with second visco-elastic components.

The beneficial effect of the present disclosure is that the OIS coils in the present disclosure are directly electrically connected to the output points of the base. Compared with the existing technology, the lens drive module of the present disclosure adopts the hollow coil instead of the FPC COIL in the existing technology, and directly connects the OIS coils produced by the hollow coil to the output points of the base, reducing the production cost and improving the price competitiveness of the lens drive module. The performance of the OIS coils produced by the hollow coil is close to or better than that of the FPC COIL in the existing technology.

DETAILED DESCRIPTION OF THE EMBODIMENTS

The present disclosure is further described below in connection with the accompanying drawings and embodiments.

It should be noted that all directional indications such as upper, lower, top, bottom, inside, outside, etc. in embodiments of the present disclosure are used only to explain a relative positional relationship between components in a particular attitude as shown in the accompanying drawings, and that the directional indications are changed accordingly if the particular attitude is changed.

When an element is said to be "fixed to" or "disposed on" another element, the element may be directly on the other element or there may be also a centered element. When an element is said to be "connected to" another element, the element may be directly connected to the other element or there may be also a centered element. In the present disclosure, x-axis, y-axis and z-axis are vertically oriented in space.

Figure 1:
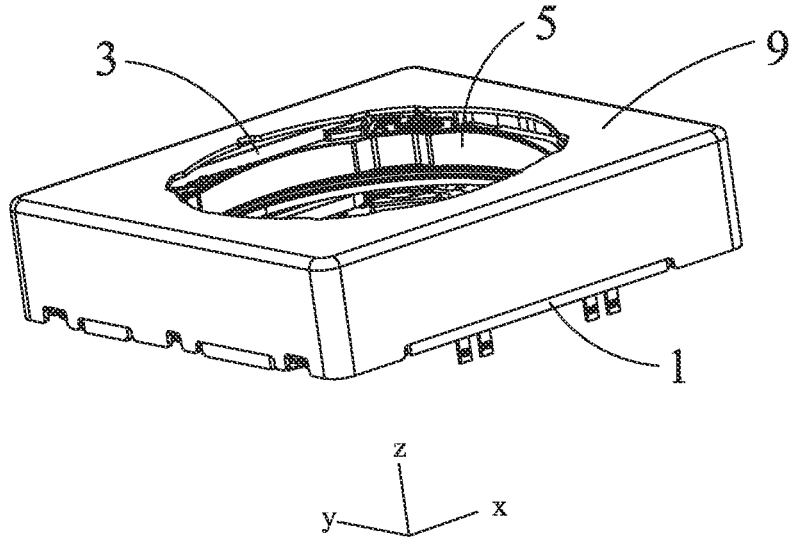
FIG. 1 is a schematic diagram of a lens drive module according to the present disclosure.
Figure 2:
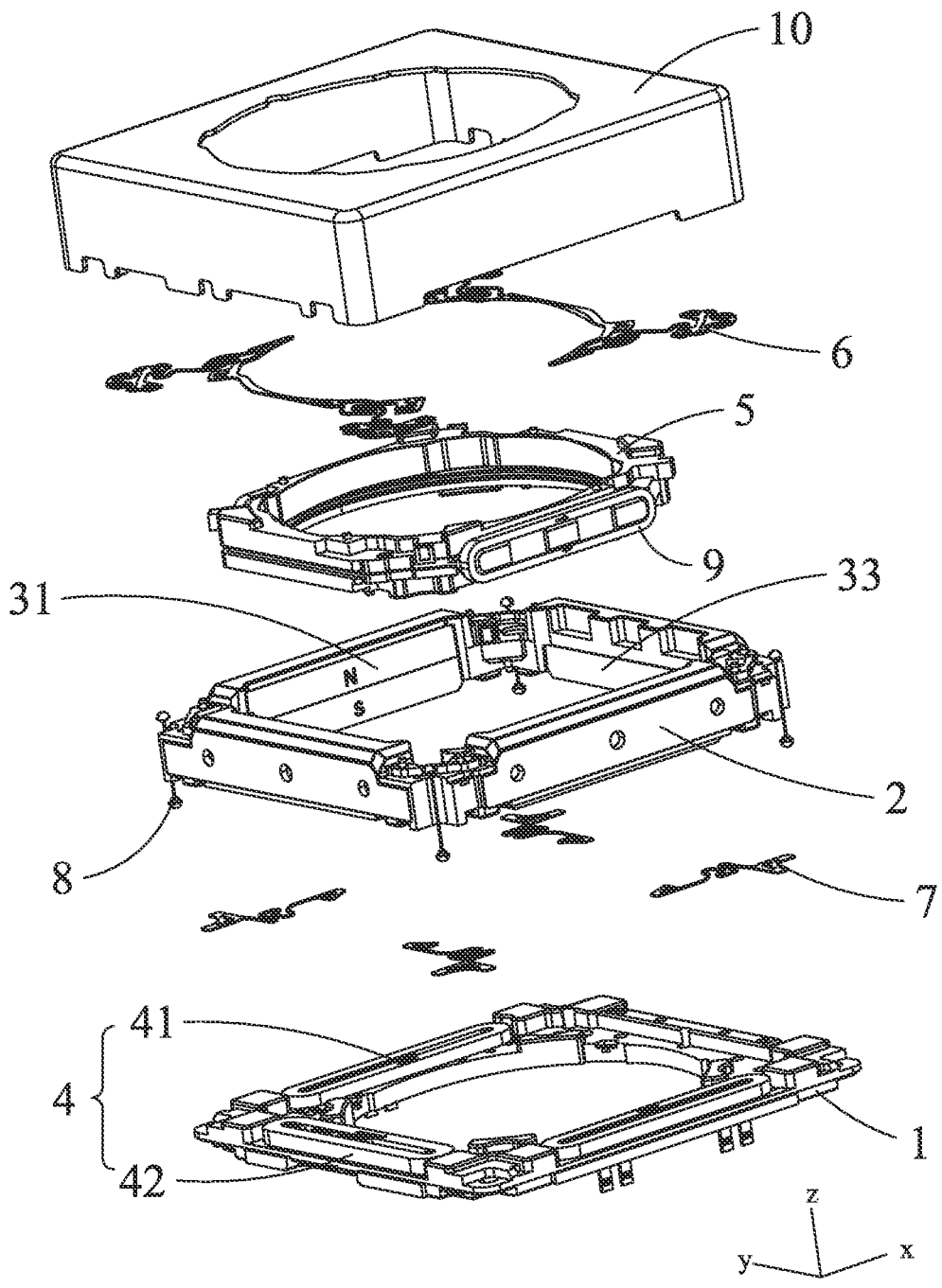
FIG. 2 is an exploded view of a lens drive module according to the present disclosure.
Figure 3:
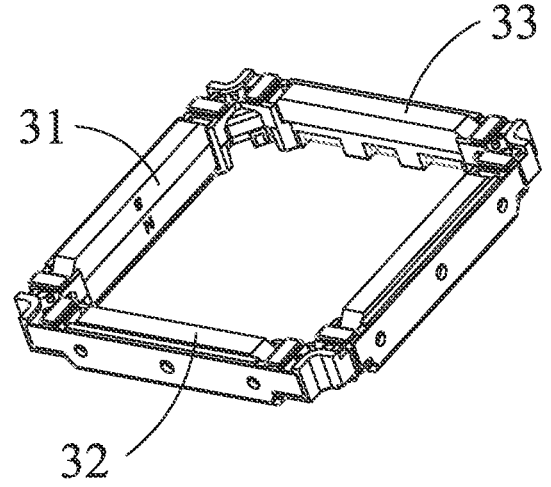
FIG. 3 is an assembly schematic diagram of a magnet group.

FIG. 1 is a schematic diagram of a lens drive module in the present disclosure, FIG. 2 is an exploded view of the lens drive module in the present disclosure, and FIG. 3 is an assembly schematic diagram of a magnet group. With reference to FIGS. 1 to 3. The lens drive module includes a base 1, a support base 2 disposed on the base 1, a magnet group 3 connected to the support base 2, optical image stabilization (OIS) coils 4 disposed on a region of the base 1 corresponding to the magnet group 3 and electrically connected to output points of the base 1, a lens barrel 5 disposed in an inner ring of the support base 2, upper leaf springs 6 disposed on a top of the support base 2, and lower leaf springs 7 disposed on a bottom of the support base 2, and suspension wires 8 each connected at both ends to the upper leaf spring 6 and to the base 1, respectively. The OIS coils 4 are directly spot welded to the output points of the base 1. Specifically, the base 1 is provided with an integrated circuit (IC), the output points include out1 and out2 of the IC, and the OIS coils 4 are directly connected to out1 and out2 of the IC via internal wiring.

The magnet group 3 includes first magnets 31 respectively disposed on two opposite sides of the support base 2, and second magnets 32 respectively disposed on two other opposite sides of the support base 2. The first magnets 31 are disposed parallel to an x-axis, and the second magnets 32 are disposed parallel to a y-axis.

Each first magnet 31 includes double magnets stacked along a direction of an optical axis of the lens barrel. The first magnet 31 including double magnets is glued and stacked along the optical axis direction of the lens barrel, and the use of the stacked double magnets makes the first magnet 31 as the drive of the OIS coils as well as endows auto focusing (AF) with a greater drive capacity and better linearity. Each second magnet 32 is a single magnet. The second magnet 32 is an N-pole magnet. Each OIS coil 4 is a hollow coil. The base 1 and the support base 2 have a rectangular shape, and the suspension wires 8 are provided on each of four corner regions of the base 1. The OIS coils in the present disclosure are directly spot welded to the inserts of the base 1 and are connected to out1 and out2 of the IC via internal wiring. Compared with the existing technology, the lens drive module in the present disclosure adopts the hollow coil instead of the FPC COIL in the existing technology, and directly sets the OIS coils produced by the hollow coil on the base, reducing the production cost and enhancing the price competitiveness of the lens drive module, and the performance of the OIS coils produced by the hollow coil is close to or better than that of the FPC COIL in the existing technology.

The OIS coils 4 include a first OIS coil 41 disposed in correspondence with the first magnet 31 and a second OIS coil 42 disposed in correspondence with the second magnet 32. The first OIS coil 41 is disposed parallel to the x-axis and the second OIS coil 42 is disposed parallel to the y-axis.

In some embodiments, the base 1 is provided with anti-collision structures each disposed on a region corresponding to a periphery of a respective one of the OIS coils 4. The anti-collision layer includes plastic, and the anti-collision layer serves to protect the OIS coils 4 to ensure its reliability and to avoid problems caused by the collision of the OIS coils 4.

Figure 4:
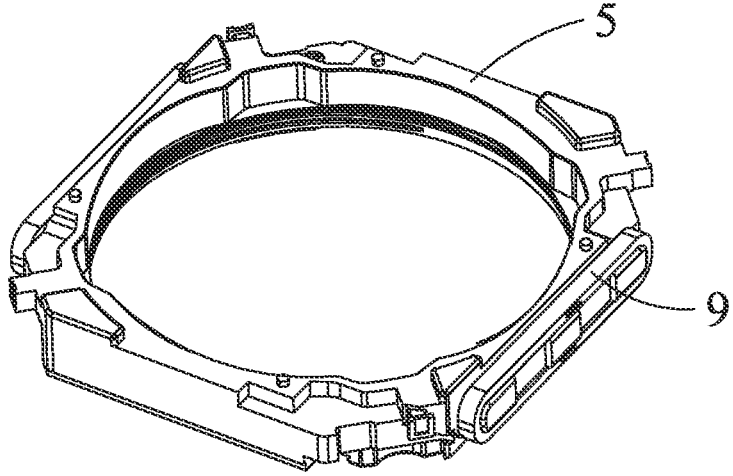
FIG. 4 is an assembly schematic diagram of AF coils.
Figure 5:
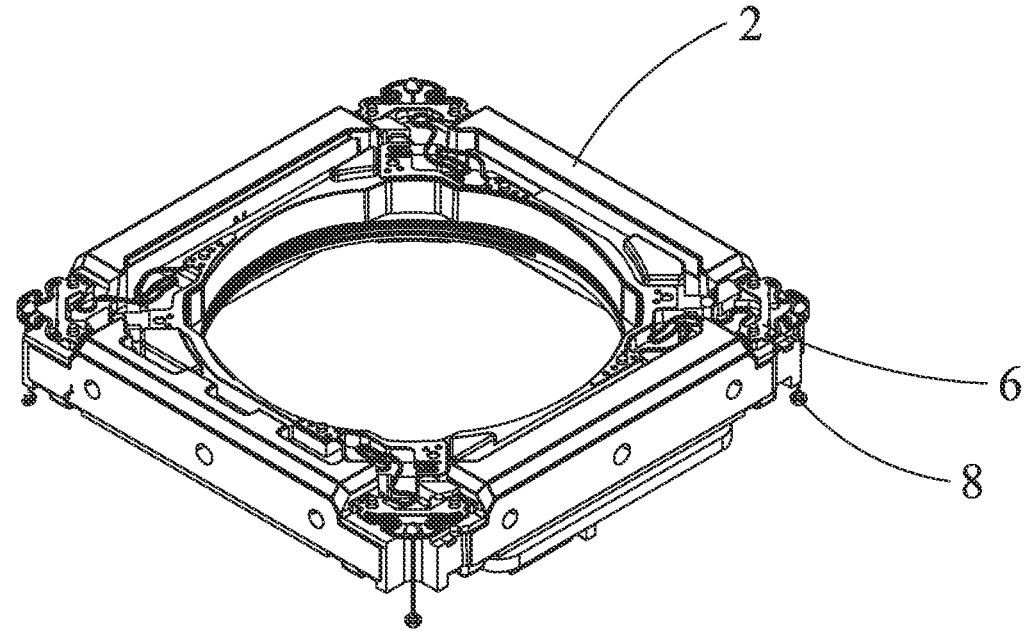
FIG. 5 is an assembly schematic diagram of an upper leaf spring.
Figure 6:
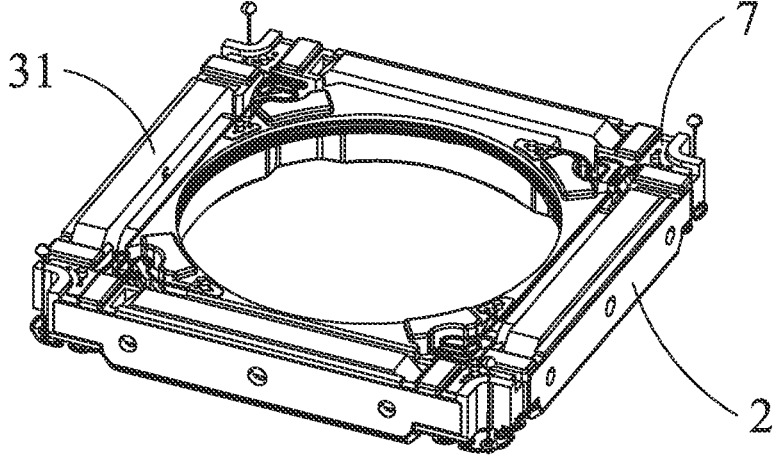
FIG. 6 is an assembly schematic diagram of a lower leaf spring.
Figure 7:
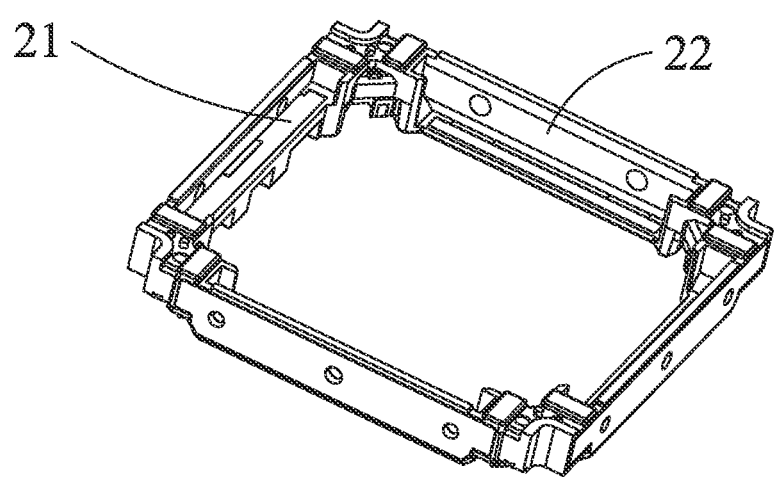
FIG. 7 is a schematic structural diagram of a support base.

FIG. 4 is an assembly schematic diagram of AF coils. With reference to FIG. 4, the lens barrel 5 is provided with AF coils 9 each disposed on a region of an outer wall of the lens barrel 5 corresponding to a respective one of the first magnets 31. The AF coils 9 are connected to each other. Each AF coil has a winding plane parallel to a plane formed by the x-axis and z-axis. The double magnets are magnetized in a direction perpendicular to a direction of the optical axis and opposite to each other. During use, each AF coil 9 is located in a magnetic field of a respective one of the first magnets 31. The first magnet 31 drives the AF coil 9 along the direction of the optical axis of the lens barrel 5 and provides a restoring force by means of the upper leaf springs 6 and the lower leaf springs 7, and the AF coils 9 drive the lens barrel 5 to realize the AF function. The lens barrel 5 is provided with support poles on the outer wall for winding the AF coils 9. During use, the OIS coils 4 are directly spot welded to the output points of the base 1, the first OIS coil 41 is located within a magnetic field range of a magnet close to the first OIS coil 41, drives the magnet to move along a first direction perpendicular to the direction of the optical axis, and provides a restoring force by means of the suspension wires 8, thereby realizing an anti-shaking OIS-X function in a horizontal X direction. The second OIS coil 42 is located within a magnetic field range of the second magnet 32, drives the second magnet 32 to move along a second direction perpendicular to the direction of the optical axis, and provides a restoring force by means of the suspension wires 8, thereby realizing an anti-shaking OIS-Y function in a horizontal Y direction. FIG. 5 is an assembly schematic diagram of the upper leaf spring, FIG. 6 is an assembly schematic diagram of the lower leaf spring, and FIG. 7 is an assembly schematic diagram of the support base. Referring to FIGS. 1 to 7, the lens drive module further includes a housing 10 connected to the base 1, and the housing 10 encloses with the base 1 to form an accommodation space for accommodating the support base 2, the magnet group 3, the lens barrel 5, the upper leaf springs 6, the lower leaf springs 7, and the OIS coils 4.

The upper leaf springs 6 are attached to top corner regions of the support base 2, and the lower leaf springs 7 are attached to bottom corner regions of the support base 2. First positioning poles connected to the upper leaf springs 6 are provided on the top of the lens barrel 5 and the top corner regions of the support base 2, and the upper leaf springs 6 are provided with first positioning holes mating with the first positioning poles. Second positioning poles connected to the lower leaf springs 7 are provided on the bottom of the lens barrel 5 and the bottom corner regions of the support base 2, and the lower leaf springs 7 are provided with second positioning holes mating with the first positioning poles.

As an improvement, the first positioning poles are plastic poles hot riveted to the top of the lens tube 5 and to the top of the support base 2.

Suspension wire leaf springs are each provided between a respective upper leaf spring 6 and a top of a respective suspension wire 8, and the suspension wire leaf spring at least partially overlapped with the upper leaf spring 6.

A method for assembling the upper leaf springs 6 includes operations of: pre-setting solder tabs on the top of the support base 2 by in-film injection molding, the solder tabs including first solder tabs connected to the upper leaf springs 6 and second solder tabs connected to the suspension wire leaf springs; assembling the upper leaf springs 6, including: assembling the upper leaf springs 6 in a mounting position at the top of the support base 2 and at the top of the lens barrel 5; setting the first positioning poles, including: hot riveting the first positioning poles on the support base 2; and laser welding the upper leaf springs 6 to the first solder tabs and laser welding the suspension wire leaf springs to the second solder tabs.

The support base 2 is provided with mounting grooves 23 for setting the first magnets 31 and the second magnets 32, respectively, and a support frame 24 is embedded in a groove wall of a respective mounting groove 23 for connecting with a respective first magnet 31 or a respective second magnet 32.

Referring to FIG. 7, in some embodiments, in order to avoid magnetic interference when the lens drive module is mounted in a main structure, three OIS coils are provided, one second magnet 32 is provided, and a counterweight 33 is provided on the side opposite to the second magnet 32. Accordingly, the OIS coils include two first OIS coils 41 provided in correspondence with the first magnets 31 and one second OIS coil 42 provided in correspondence with the second magnet 32. Furthermore, the magnet group is a three-sided magnet structure, reducing the number of magnets to be provided and further reducing the production cost of the lens drive module.

The lens barrel 5 and the top corner regions of the support base 2 are provided with first visco-elastic components, and the bottom corner regions of the support base 2 and top corner regions of the base 1 are provided with second visco-elastic components.

The above description is merely embodiments of the present disclosure, and it should be noted that, for those of ordinary skill in the art, improvements are able to be made without departing from the inventive conception of the present disclosure, all of which fall within the protection scope of the present disclosure.

What is claimed is:

1. A lens drive module comprising a base, a support base disposed on the base, a magnet group connected to the support base, optical image stabilization (OIS) coils disposed on a region of the base corresponding to the magnet group and electrically connected to output points of the base, a lens barrel disposed in an inner ring of the support base, upper leaf springs disposed on a top of the support base, lower leaf springs disposed on a bottom of the support base, and suspension wires each connected at both ends to a respective upper leaf spring and to the base, respectively;

wherein the magnet group includes first magnets respectively disposed on two opposite sides of the support base, and second magnets respectively disposed on two other opposite sides of the support base; wherein each of the first magnets includes double magnets stacked along a direction of an optical axis of the lens barrel, and each of the second magnets is a single magnet; and wherein each of the OIS coils is a hollow coil.

2. The lens drive module according to claim 1, wherein each of the OIS coils includes a first OIS coil provided in correspondence with a respective first magnet and a second OIS coil provided in correspondence with a respective second magnet.

3. The lens drive module according to claim 1, wherein the lens barrel is provided with auto focusing (AF) coils each disposed on a region of an outer wall of the lens barrel corresponding to a respective first magnet, the AF coils are connected to each other, and each of the AF coils has a winding plane parallel to a plane formed by an x axis and a z axis.

4. The lens drive module according to claim 1, wherein the double magnets are magnetized in a direction perpendicular to the direction of the optical axis and opposite to each other.

5. The lens drive module according to claim 1, wherein the base is provided with anti-collision structures each disposed on a region corresponding to a periphery of a respective OIS coil.

6. The lens drive module according to claim 1, further comprising: a housing connected to the base, and the housing encloses with the base to form an accommodation space for accommodating the support base, the magnet group, the lens barrel, the upper leaf springs, the lower leaf springs, and the OIS coils.

7. The lens drive module according to claim 1, wherein the upper leaf springs are attached to top corner regions of the support base, and the lower leaf springs are attached to bottom corner regions of the support base; and wherein the lens drive module further includes:

first positioning poles connected to the upper leaf springs and provided on a top of the lens barrel and the top corner regions of the support base, wherein the upper leaf springs are provided with first positioning holes mating with the first positioning poles;

second positioning poles connected to the lower leaf springs and provided on a bottom of the lens barrel and the bottom corner regions of the support base, wherein the lower leaf springs are provided with second positioning holes mating with the second positioning poles;

suspension wire leaf springs each provided between the respective upper leaf spring and a top of a respective suspension wire, wherein each of the suspension wire leaf springs is at least partially overlapped with the respective upper leaf spring; and solder tabs provided on the support base, wherein the solder tabs include first solder tabs connected to the upper leaf springs and second solder tabs connected to the suspension wire leaf springs, wherein the first positioning poles are hot riveted on the support base, each of the upper leaf springs is welded to a respective first solder tab by laser, and each of the suspension wire leaf springs is welded to a respective second solder tab by laser.

8. The lens drive module according to claim 1, wherein the support base is provided with mounting grooves for setting the first magnets and the second magnets, respectively, and a support frame is embedded in a groove wall of a respective mounting groove for connecting with a respective first magnet or a respective second magnet.

9. The lens drive module according to claim 1, wherein the lens barrel and top corner regions of the support base are provided with first visco-elastic components, and bottom corner regions of the support base and top corner regions of the base are provided with second visco-elastic components.

* * * * *